(12) United States Patent
Chuang et al.

(10) Patent No.: US 11,120,539 B2
(45) Date of Patent: Sep. 14, 2021

(54) TOPOLOGICAL SCANNING METHOD AND SYSTEM

(71) Applicant: Taiwan Semiconductor Manufacturing Co., Ltd., Hsin-Chu (TW)

(72) Inventors: Sheng-Hsiang Chuang, Hsin-Chu (TW); Jiao-Rou Liao, Taichung (TW); Cheng-Kang Hu, Kaohsiung (TW); Shou-Wen Kuo, Hsinchu (TW); Jiun-Rong Pai, Jhubei (TW); Hsu-Shui Liu, Pingjhen (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 33 days.

(21) Appl. No.: 16/204,387

(22) Filed: Nov. 29, 2018

(65) Prior Publication Data

US 2019/0244343 A1 Aug. 8, 2019

Related U.S. Application Data

(60) Provisional application No. 62/592,650, filed on Nov. 30, 2017.

(51) Int. Cl.
| | |
|---|---|
| *G06T 7/00* | (2017.01) |
| *G06T 7/62* | (2017.01) |
| *G01B 11/30* | (2006.01) |
| *G06T 5/00* | (2006.01) |
| *G01B 21/04* | (2006.01) |

(52) U.S. Cl.
CPC ............ *G06T 7/0004* (2013.01); *G01B 11/30* (2013.01); *G01B 21/045* (2013.01); *G06T 5/005* (2013.01); *G06T 7/62* (2017.01); *G06T 2207/10008* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 2006/0181700 A1* | 8/2006 | Andrews | G01N 21/474 356/237.2 |
| 2008/0023455 A1* | 1/2008 | Idaka | B23K 26/082 219/121.73 |
| 2013/0206839 A1* | 8/2013 | Gao | G06K 7/10861 235/462.42 |

* cited by examiner

*Primary Examiner* — Kim Y Vu
*Assistant Examiner* — Nathan J Bloom
(74) *Attorney, Agent, or Firm* — Duane Morris LLP

(57) ABSTRACT

A method for scanning and analyzing a surface, the method comprising: receiving a piece of equipment with a target surface for inspection; receiving an input from a user; determining at least one scan parameter based on the user input; scanning the target surface using an optical detector in accordance with the at least one scan parameter; generating an image of the target surface; correcting the image of the target surface to remove at least one undesired feature to generate a corrected image based on the at least one scan parameter; and analyzing the corrected image to determine at least one geometric parameter of the target surface.

20 Claims, 11 Drawing Sheets

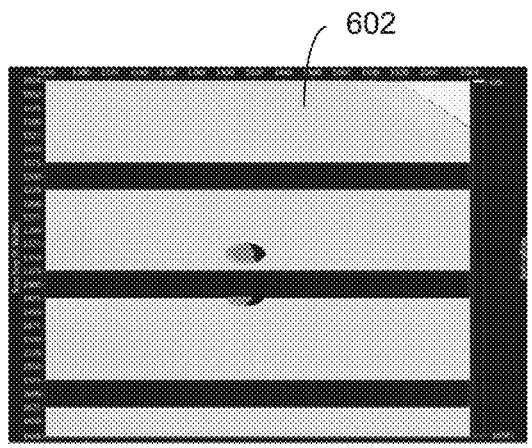
FIG. 6A-1
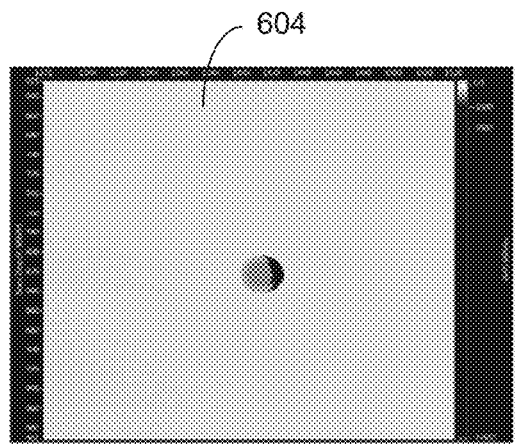
FIG. 6A-2
FIG. 6A
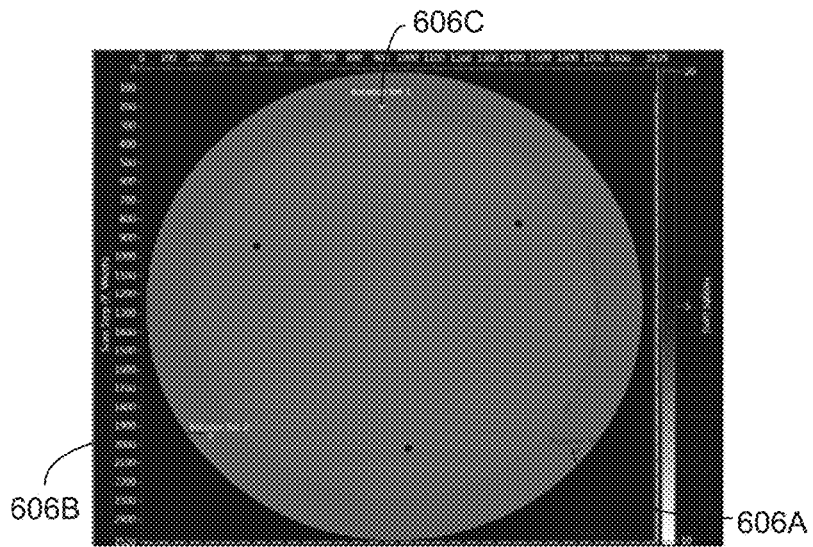
FIG. 6B

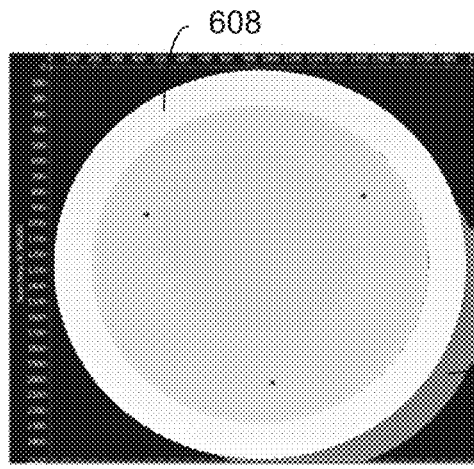
FIG. 6C-1
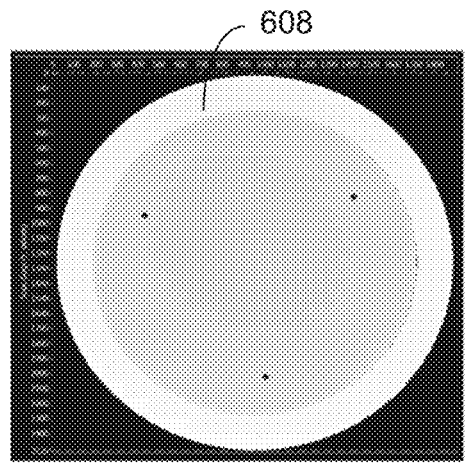
FIG. 6C-2
FIG. 6C
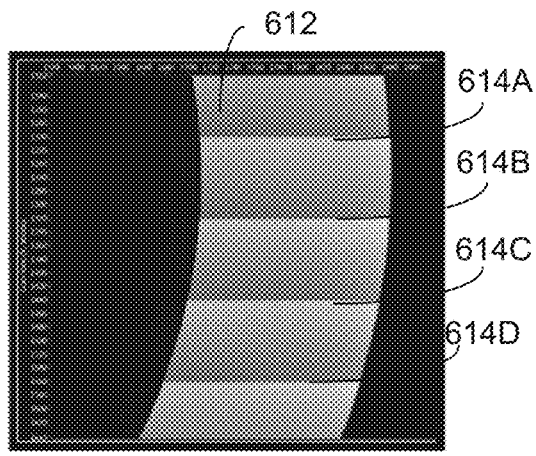
FIG. 6D-1
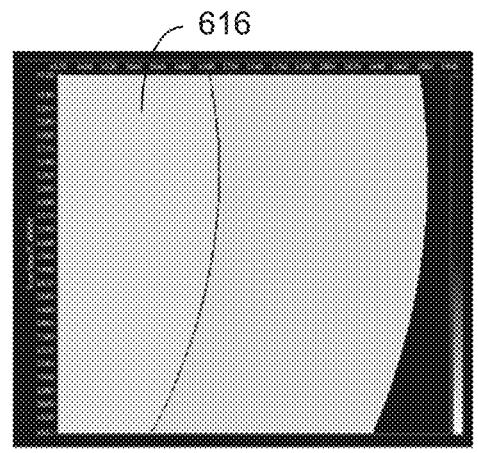
FIG.6D-2
FIG. 6D

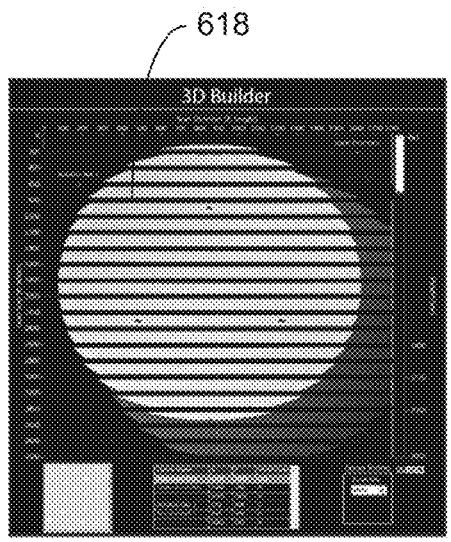 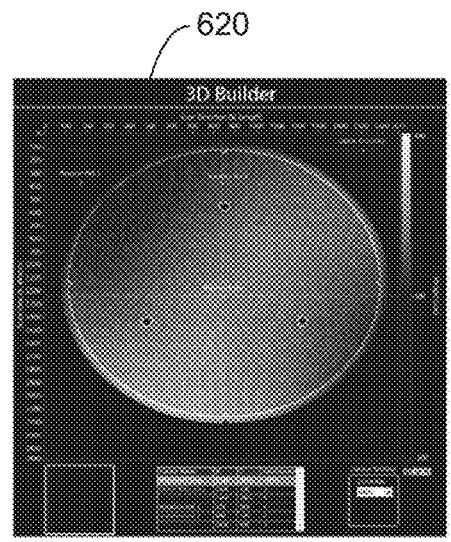
FIG. 6E-1  FIG. 6E-2
FIG. 6E
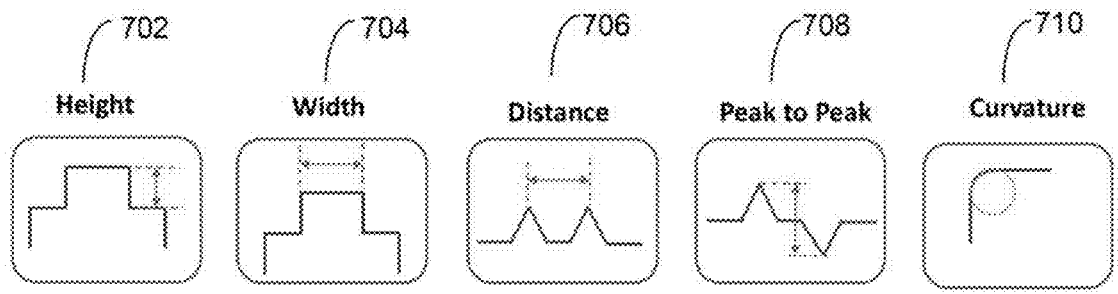
FIG. 7

TOPOLOGICAL SCANNING METHOD AND SYSTEM

CROSS-REFERENCE TO RELATED APPLICATION

The present application claims priority to U.S. Provisional Patent Application No. 62/592,650, filed on Nov. 30, 2017, which is incorporated by reference herein in its entirety.

BACKGROUND

The quality, consistency, and cost of machined products depend on a complex combination of the performance of process steps and equipment. Manufacturing of complex, high-value products are expensive and time consuming, requiring lengthy trial-and-error procedures and resulting in wasted resources due to uncertainties in material properties or behavior under manufacturing conditions, as well as in performance of manufacturing equipment. These inconsistencies or uncertainties, at least in part, result from a lack of suitable or accurate metrology equipment for inspecting and monitoring the adverse effects on manufacturing equipment caused by varying environmental conditions. Therefore, besides in-line inspections of product for detecting defect levels, early detection of variations in the manufacturing equipment also known as preventive maintenance, using metrology equipment would be beneficial to the production of high quality and consistent products.

Period maintenance (PM) is maintenance that is regularly performed on a piece of equipment to lessen the likelihood of failing or causing undesired variations in products during a manufacturing process. Preventative maintenance is performed while the equipment is still functional to ultimately decrease the amount of unscheduled equipment maintenance down time. An effective PM routine reduces losses of equipment, decreases operational down time, extends the lifetime of equipment, and produces consistent operational conditions for the manufacturing process.

Surface conditions of critical parts can be imperative to manufacturing processes, especially those that are exposed to the process environment. Progressive changes to the surface of critical parts can result in variations in flow patterns of reactive gases, for example, which affects the delivery of reactants leading to non-uniformities or inconsistencies in the reaction rate. causing unwanted variations in thickness and/or other physical/chemical properties of the prepared films. For example, surface profiles of sample holders or stages can be altered during processes such as, for example, a cleaning process (e.g., chemical etching or mechano-chemical polishing) or a high-temperature process. Metrology equipment for topological measurement to monitor these parts is desirable for effective quality control. Traditional certificate of analysis (COA) techniques e.g., using traditional instruments (e.g., stylus profilometer), have limited performance parameters, e.g., trade-off between scan speed and resolution. Therefore, to ensure equipment is operating under control, there is a need for an apparatus and a method for automatically performing quick and precise scanning of parts to monitor their surface conditions to improve the PM success rate and expand equipment/tool lifetimes.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of illustration.

FIG. 6A illustrates a surface image before (6A-1) and after (6A-2) assembled from a plurality of compressed and overlapped line scan images, in accordance with some embodiments.

FIG. 6B illustrates a selection of three reference points to define a reference plane to eliminate leveling error, in accordance with some embodiments.

FIG. 6C illustrates a surface image before (6C-1) and after (6C-2) eliminating out-of-range height data, in accordance with some embodiments.

FIG. 6D illustrates a surface image assembled from a plurality of line scan images collected by a misaligned laser displacement sensor before (6D-1) and after (6D-2) correcting the detector tilt problem, in accordance with some embodiments.

FIG. 6E illustrates a surface image before (6E-1) and after (6E-2) assembled from a plurality of line scan images, in accordance with some embodiments.

FIG. 7 shows an exemplary user interface for selecting various post-processing functions, in accordance with some embodiments.

DETAILED DESCRIPTION OF EXEMPLARY EMBODIMENTS

Figure 1:
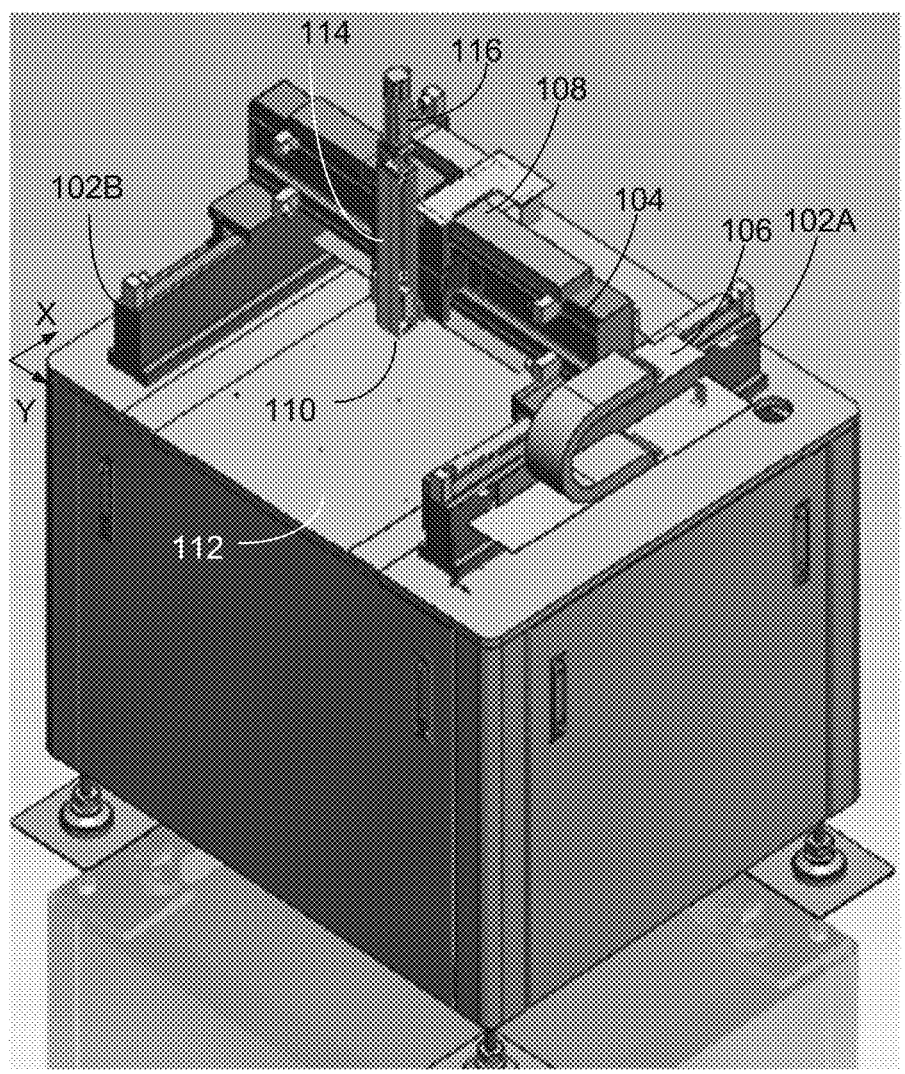
FIG. 1 illustrates a schematic of a system for scanning a surface, in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. For example, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Moreover, "first", "second", "third", etc. may be used herein for ease of description to distinguish between different elements of a figure or a series of figures. "first", "second", "third", etc. are not intended to be descriptive of the corresponding element. Therefore, "a first wafer" described in connection with a first figure may not necessarily corresponding to a "first wafer" described in connection with another figure.

The presented disclosure provides various embodiments of an inspection system that is used for scanning and analyzing a target surface. In contrast to traditional contact profile measurement techniques (e.g., profilometer), this inspection system can provide quick scans on large surfaces or high-resolution scans on small surfaces in a line-by-line fashion through a quick, non-contact, and non-destructive laser system. Line scan images are then assembled and corrected through functions provided by a user interface to determine the topological profiles and geometric parameters of the target surfaces, in accordance with some embodiments. Such presented inspection processes provide high-throughput topological studies on target surfaces without compromising a high inspection resolution (i.e., no trade-off between the sampling rate and the inspection resolution). Accordingly, the above-mentioned issues in the conventional inspection system may be advantageously avoided.

FIG. 1 illustrates a schematic of an inspection system 100 for scanning a surface, in accordance with some embodiments. The surface scan system comprises a pair of tracks 102A and 102B that guide a movement of an optical detector 110 in a first horizontal direction (i.e., X-direction), and a track 104 that guides a movement of the optical detector 110 in a second horizontal direction (i.e., Y-direction) that is normal to the first horizontal direction (e.g., X-direction). The X-Y plane can be parallel to the plane of a stage 112, on which a part to be inspected can be placed. Motors 106 and 108 provide linear movements in the X- and Y-direction such that the optical sensor 110 in the X-Y plane can scan the surface of the part (not shown) on the stage 112. In some embodiments, the optical detector 110 can also move in a third vertical direction (e.g., Z-direction) that is perpendicular to the X-Y plane on a track 114 controlled by a motor 116. In some embodiments, the motors 106, 108, and 116 can be linear electric motors providing high speed linear motion and accurate position control of the optical detector 110. In some embodiments, to investigate non-planar surfaces of 3-dimensional (3D) parts, a sample holder that rotates along at least one aforementioned axis may be also implemented to provide a combination of motion to the part under investigation relative to the optical detector 110. In some embodiments, a plurality of optical detectors 110 can be used to scan complex surfaces, to simultaneously scan multiple parts or multiple locations on a same surface, or to scan parts on a conveyor stage/a robot arm.

In some embodiments, the optical detector 110 provides a non-contact means to scan a surface. In some embodiments, the optical detector 110 can be a laser displacement sensor, a phase-modulated beam sensor, or a white-light confocal fiber displacement sensor, in accordance with some embodiments. All of these method rely on the measurement of a position of a target surface by measuring the reflected light from the target surface. In a laser displacement sensor, for example, a laser diode emits a laser at a certain wavelength (e.g., 660 nm) and focuses on a spot on the target surface, and its reflection is focused via an optical lens on a light sensitive device or a photodetector, typically also located in the optical detector 110. If the target surface changes its position from the reference point, the position of the reflected spot of light on the detector changes as well. The signal conditioning electronics of the laser detects the spot position of the reflected laser on the photodetector and, following linearization and additional digital or analogue signal conditioning, provides an output signal proportional to target position in the Z-direction and thus curvatures or features on the target surface can be revealed. In some embodiments, a laser system can include a spatial resolution of 1.8 micrometers in the Z-direction, a spatial resolution of 10-20 micrometers in the X-Y direction, a measurement range of 25 millimeters in the X-Y direction, a measurement range of 25 millimeters in the Z direction, a sampling rate of 170-5000 Hz, etc. In one embodiment, the laser displacement sensor can be a Gocator 2320 sensor, for example.

In some embodiments, the photodetector in the laser displacement sensor can be a CCD (Charge-Coupled Devices) based detector (hereinafter "CCD detector") to avoid problems associated with traditional laser displacement sensing systems which are sensitive to measurement conditions such as, for example laser intensity, tilt angle, surface morphology, etc. The CCD detector includes a digital pixelated detector array with a plurality of individual detectors (i.e., pixels), that can output a plurality of discrete voltages representing the amount of light (i.e., light intensity) falling on each pixel of the detector. The intensity distribution of the imaged spot is processed by a digital signal processing (DSP) device and image processing is then incorporated. This post data processing of the intensity distribution on the CCD detector overcomes the aforementioned problems associated with traditional laser based displacement sensing systems. DSP transforms a plurality of discrete voltages to a physical significance, which represent distances between the sensor and the target spots on the surface.

In some embodiments, one single pixel with the highest light intensity and sub-pixel resolution can be realized by interpreting the light intensity of adjacent pixels using a pre-programmed algorithm. A threshold is predefined to discard unwanted information pertaining to stray and secondary reflections, which would cause a DSP receiver to change its output. In some embodiments, a closed loop control can be further coupled to the CCD detector to adjust the power of the laser source, according to the amount of reflected light intensity received from the target surface. Therefore, an optimum light intensity for the CCD detector can be achieved with the assistance of the closed loop control, regardless of the target color or its surface texture.

Alternatively, in another embodiment, a white-light confocal fiber sensing system can be used as the optical detector 110 in the system 100. Compared to a traditional laser displacement sensor, a white-light confocal sensor is an ultra-precise displacement measurement system that can be used to perform scanning of a surface. In some embodiments, a white-light confocal fiber sensing system comprises a light source that emits a broad spectrum of light (e.g., white light), a fiber-optic cable, a probe head, a spectrometer, and an optoelectronic controller. The probe head composed of a plurality of lenses focuses the white light emitted from the light source (e.g., light emitting diode arrays, Xenon arc lamp, Halogen lamp, and the like) through the fiber-optic cable on the target surface and collects reflected light back to the optoelectronic controller through the fiber-optic cable. In some embodiments, intensities of the individual light emitting diodes (LED) in the LED array can be individually programmed by the optoelectronic controller. In some embodiments, the probe head comprises a plurality of lenses, which disperses the white light into monochromatic stages or colors along the measurement axis (e.g., Z-axis). A specific distance to the target surface is assigned to the wavelength of each color. Only the wavelength which is exactly focused on the target is used for the measurement. This light reflected from the target surface is transmitted from the probe, through a confocal aperture and onto a spectrometer which detects and processes the spectral changes and calculates distances. In one embodiment, a white-light confocal fiber sensing system can be an Omron ZW-S7010.

Advantages of using the white-light confocal compared to the traditional laser displacement system further include no additional re-tune after changing scan direction or materials, easy installation without fine angle adjustment, accurate measurement on coarse surfaces, high-speed sampling, high throughput, high thermal stability, no discrepancy in measurement point, accurate measurement in small spaces, etc.

In some embodiments, different probe heads for the white-light confocal optics sensing system can be changed for different working ranges in order to meet the measurement requirements of spatial resolution and scan speed for various applications. The spectrometer in this system can be a CMOS sensor, which can be optimized to measure wavelengths or spectrum changes precisely with high sensitivity and stability, in accordance with some embodiments.

Figure 2:
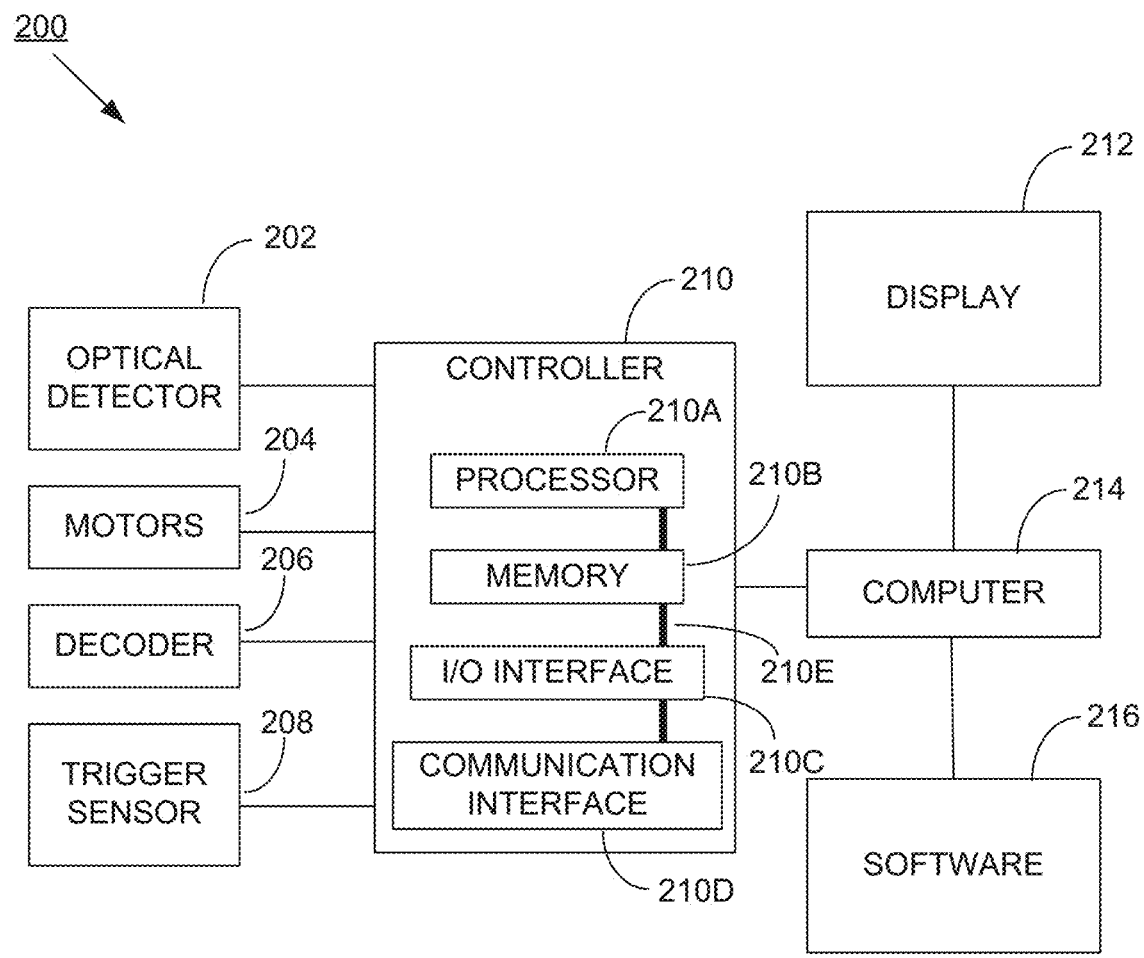
FIG. 2 illustrates a block diagram of a system for scanning a surface, in accordance with some embodiments.

FIG. 2 illustrates a block diagram of an inspection system 200 for scanning a surface, in accordance with some embodiments. The system comprises at least one optical detector 202, a plurality of motors 204 that can control the movement of the optical detector in the X-Y direction as shown in FIG. 1. An additional motor 204 can be used for the adjustment of the position of the optical detector 202 in the Z-direction, in accordance with some embodiments, to accommodate the use of the mechanical system with different detectors with different field of view or working distances. At least one decoder 206 is installed on a plurality of tracks to provide position data. In some embodiments, at least one trigger sensor 208 can be also used to trigger a scan. In some embodiments, a digital camera can be also used to guide the positioning of the optical detector 200 to the position such as a starting point or an area of interest.

A controller 210 in the system 200 for scanning a surface is a representative device and may comprise a processor 210A, a memory 210B, an input/output interface 210C (hereinafter "I/O interface"), a communications interface 210D, and a system bus 210E. In some embodiments, components in the controller 210 in the system 200 may be combined or omitted such as, for example, not including the communications interface 210D. In some embodiments, the controller 210 of the system 200 may comprise other components not combined or comprised in those shown in FIG. 2. For example, the controller 210 of the system 200 also may comprise a power subsystem providing power to the light source. In other embodiments, the controller 210 of the system 200 may comprise several instances of the components shown in FIG. 2.

The processor 210A may comprise any processing circuitry operative to control the operations and performance of the controller 210 of the system 200. In various aspects, the processor 210A may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 406 also may be implemented by a controller, a microcontroller, an application specific integrated circuit (ASIC), a field programmable gate array (FPGA), a programmable logic device (PLD), and so forth.

In various aspects, the processor 210A may be arranged to run an operating system (OS) and various applications. Examples of an OS comprise, for example, operating systems generally known under the trade name of Apple OS, Microsoft Windows OS, Android OS, and any other proprietary or open source OS. Examples of applications comprise, for example, a telephone application, a camera (e.g., digital camera, video camera) application, a browser application, a multimedia player application, a gaming application, a messaging application (e.g., email, short message, multimedia), a viewer application, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in the memory 210B.

In some embodiments, the memory 210B may comprise any machine-readable or computer-readable media capable of storing data, including both volatile/non-volatile memory and removable/non-removable memory. The memory 210B may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the controller 210 of the system 200.

For example, memory 210B may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory 210B may contain an instruction set, in the form of a file for executing a method of generating one or more timing libraries as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processor 210A.

In some embodiments, the I/O interface 210C may comprise any suitable mechanism or component to at least enable a user to provide input to the controller 210 and the controller 210 to provide output to the user. For example, the I/O interface 210C may comprise any suitable input mechanism, including but not limited to, a button, keypad, keyboard, click wheel, touch screen, or motion sensor. In some embodiments, the I/O interface 210C may comprise a capacitive sensing mechanism, or a multi-touch capacitive sensing mechanism (e.g., a touch screen).

In some embodiments, the I/O interface 210C may comprise a visual peripheral output device for providing a display visible to the user. For example, the visual peripheral output device may comprise a screen such as, for example, a Liquid Crystal Display (LCD) screen, incorporated into the controller 210 of the system 200. As another example, the visual peripheral output device may comprise a movable display or projecting system for providing a display of content on a surface remote from the controller 210 of the system 200. In some embodiments, the visual peripheral output device can comprise a coder/decoder, also known as a Codec, to convert digital media data into analog signals. For example, the visual peripheral output device may comprise video Codecs, audio Codecs, or any other suitable type of Codec.

The visual peripheral output device also may comprise display drivers, circuitry for driving display drivers, or both. The visual peripheral output device may be operative to display content under the direction of the processor 210A. For example, the visual peripheral output device may be able to play media playback information, application screens for application implemented on the controller 210 of the topological scan system 200, information regarding ongoing communications operations, information regarding incoming communications requests, or device operation screens, to name only a few.

In some embodiments, the communications interface 210D may comprise any suitable hardware, software, or combination of hardware and software that is capable of coupling the controller 210 of the system 200 to one or more networks and/or additional devices (such as, for example, the optical detector 202, motor 204, decoder 206, and trigger sensor 208). The communications interface 210D may be arranged to operate with any suitable technique for controlling information signals using a desired set of communications protocols, services or operating procedures. The communications interface 210D may comprise the appropriate physical connectors to connect with a corresponding communications medium, whether wired or wireless.

Systems and methods of communication comprise a network, in accordance with some embodiments. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery such as a circuit generating system 404, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fiber Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 210D may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 210D may comprise a wireless interface comprising one or more antennas, transmitters, receivers, transceivers, amplifiers, filters, control logic, and so forth.

In various aspects, the communications interface 210D may provide voice and/or data communications functionality in accordance a number of wireless protocols. Examples of wireless protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, the controller 210 of the system 200 may comprise a system bus 210E that couples various system components including the processor 210A, the memory 210B, and the I/O interface 210C. The system bus 210E can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

The controller 210 is connected to at least one optical detector 202, as well as the plurality of motors 204, decoder 206 and trigger sensor 208, respectively. In some embodiments, the controller 210 may also comprise a programmable light source, and a CMOS spectroscope, which are connected to the probe head of the optical detector through an optical fiber. In some embodiments, the controller may also comprise a local display and a control panel. The controller 210 can be connected to a local or a remote computer 214 through the communication interface 210D. The computer can be then connected to a display 212 to display raw data, reconstructed images, and user interfaces of software programs 216. The software program 216 will be further discussed in detail in FIG. 4.

Figure 3:
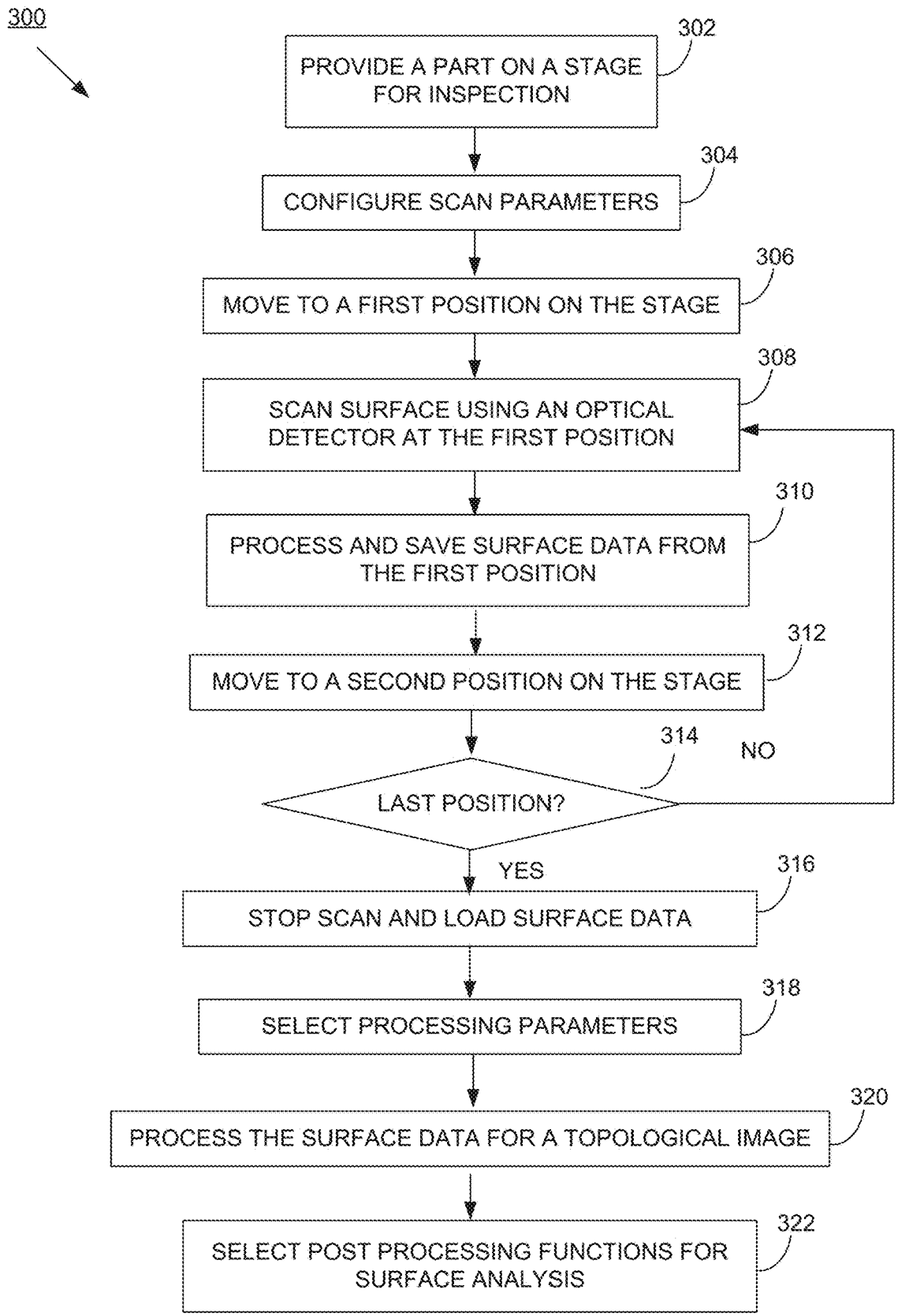
FIG. 3 illustrates a process flow of a method to perform scanning of a surface and process surface data to construct a topological image of the surface, in accordance with some embodiments.

FIG. 3 illustrates a process flow of a method 300 to perform scanning of a surface and process surface data to construct a topological image of the surface, in accordance with some embodiments. The method 300 starts with operation 302 wherein a part with a target surface for inspection can be provided on a stage of a scan system. In some embodiments, the part can be a wafer holder, a susceptor, etc, from systems such as, for example physical vapor deposition, chemical vapor deposition, atomic layer deposition, epitaxial growth furnaces, and etc. The materials of the part can be aluminum, ceramic, quartz, and etc. In some embodiments, the parts under the topological scan can be a Silicon wafer, a MEMS (microelectromechincal system) substrate, etc.

The method 300 continues with operation 304, wherein scan parameters are configured. Scan parameters include number of scan lines, scan line width, scan line length, scan range, scan speed, scan exposure, substrate surface type, resolution, and etc. In some embodiments, these parameters are preconfigured and saved in recipe files stored in a library for quick load of scan parameters. The controller can first initialize the system by reading the currently installed optical detector, and/or shift the stage to the initialization position, in accordance with some embodiments. Based on the configured scan parameters, the controller can provide users with recommended probe heads and light sources for desired performance (e.g., spatial resolution and scan speed).

In some embodiments, scan parameters also include laser power, exposure time, surface conditions, resolution and range, which affects the selection of proper optical detector in operation 304. Laser displacement sensing devices are ideal for measuring distances of a few inches with high accuracy. Laser displacement sensing devices maybe built on any scale, but the accuracy falls off rapidly with increasing range. In some embodiments, the exposure and laser power level are typically controlled to optimize the accuracy of the measurements for the signal strength and environmental light level measured.

The reliability and repeatability of the laser displacement sensor can be compromised by a number of practical variations in the nature of the target surface. Surface conditions, textures or tilt change, for example, this will change the shape of the reflected light spot on the detector, altering the center of light distribution, and inducing a change in output of the laser displacement sensor signal, even though the true position of the target surface in the Z-direction is constant. laser displacement sensor systems are also very sensitive to light intensity, and if this changes while the spot position remains the same, it will result in an output change, same to the effect of a change in target color. Some of these practical effects can be corrected in the image processing operation, which will be further discussed in detail.

In some embodiments, a laser displacement sensor with a smart CCD detector can be also selected depending on the scan range and scan speed which can react spontaneously to changing surface conditions, to achieve accurate results regardless of surface texture or color. In accordance with some embodiments, target alignment (tilt-angle issue) is a non-issue, and the effects of stray and secondary reflections are eliminated. For a stable measurement, as little as 1% diffuse reflectivity is required for a CCD detector, in some embodiments, so black or shiny targets no longer present the problems they posed in the traditional technology.

After configuring scan parameters, the method 300 continues with operation 306, in which the controller instructs the motors to move the optical detector to a first defined position for scanning. In some embodiments, the optical detector can be rotated during this operation along the Z-direction perpendicular to the X-Y plane, e.g., when a traditional laser displacement sensor is used.

The method 300 further continues with operation 308, wherein the position data at the first position is collected by the optical detector and processed by the processor in the controller. In some embodiments, the distance between the surface under illumination and the detector head is determined by the position of the reflected light laser spot on the detector from a reflective surface. In some embodiments, the distance is determined by the intensity of the reflected light on a CCD detector from non-reflective surfaces. In another embodiment, the distance is determined by the wavelength of the reflected light on a spectroscope.

The method 300 continues with operation 310, wherein data collected during the preset exposure time can be averaged over multiple exposures prior to transmitting if the sample rate is set appropriately. In some embodiments, the surface data can be stored in the memory 210B of the controller 210 and may be transferred through the communication interface 210D to the external local or network computer 214 and finally shown on the display 212.

The method 300 continues with operation 312 and 314, wherein the optical detector is moved to a second position after recording data from the first position. If the second position is not the last position on the target surface, the method 300 then repeats operations 308 and 310 as described above. If the second position is the last position on the target surface, the method 300 continues with operation 316, wherein the line scan data is transferred to the computer 214 and assembled to create one or more raw topological images.

The method 300 continues with operation 318, wherein processing parameters are configured. Parameters for processing include but are not limited to data rescale, data compression in x-y directions, data shift along x or y directions, scan line overlap width, data rotation, data leveling and height filter values.

Based on the processing parameters configured during operation 318, the method 300 further continues with operation 320 wherein the raw topological image can be processed for a proper representation of the target surface, e.g., scan line overlap, rotation, leveling, and data compression. In some embodiments, a height filter may also be applied to filterout out-of-range height values/data in order to remove the background image data, for example (e.g., the surface of the stage).

The method 300 continues with operation 322, wherein functions can be selected for post-processing of the processed topological image and quantitative analysis of the target surface can be achieved. Functions include but are not limit to measurement of step height, bump width, point-to-point distance, peak-to-peak vertical distance, curvature, area, flatness, surface roughness, eccentricity, etc., in accordance with various embodiments.

Figure 4:
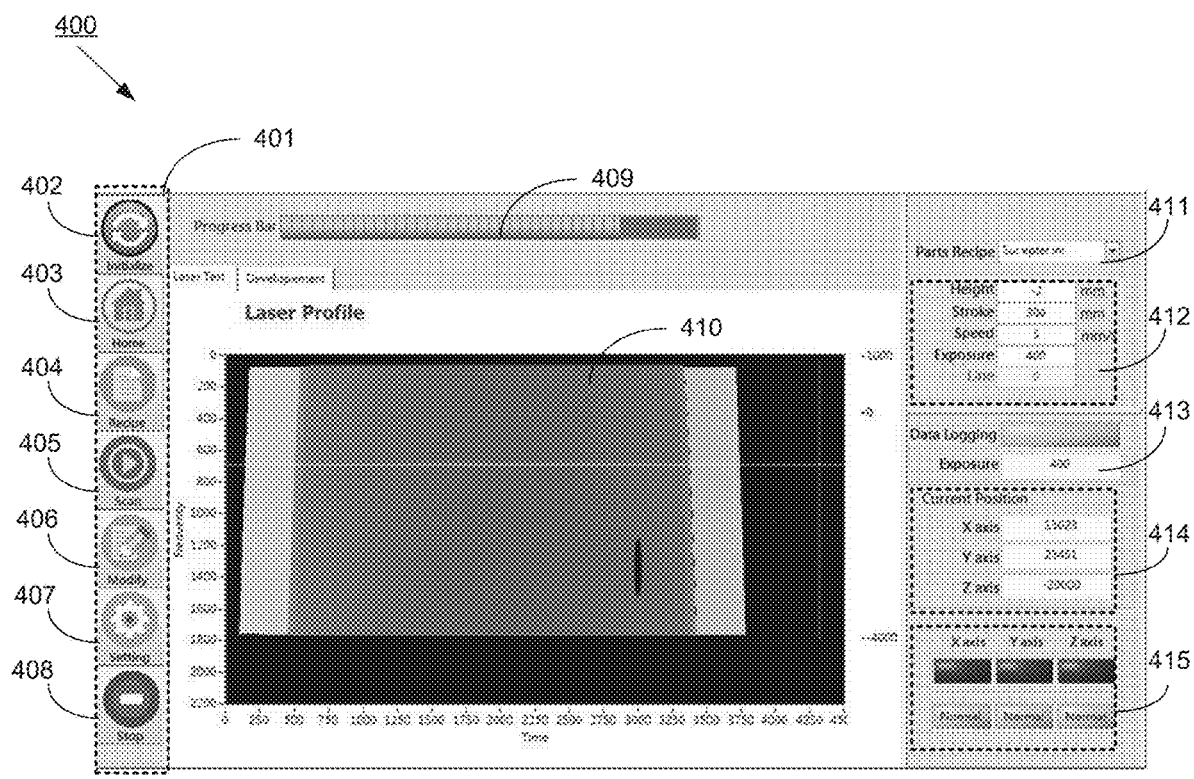
FIG. 4 is a graphic representation of a user interface of a software program that is used for configuring a scanning of a surface, in accordance with some embodiments.

FIG. 4 is a graphic representation of a user interface 400 of a software program that is used for configuring a scanning of a surface, in accordance with some embodiments. A user can click on the menu 401 on the left of the interface 400 to switch between functions such as initialize 402, home 403, recipe 404, scan 405, modify 406, setting 407 and stop 408, for example. By clicking on the initialize function 402, the controller 210 can configure the motors to move an optical detector to its default initialization position, and meanwhile, collect system information including type of optical detector currently installed, light intensity, etc. By clicking on the home function 403, the user can also move the optical detector to a predefined home position. In order to select a predefined recipe which contains parts or surface information, e.g., size, materials, surface conditions, etc., the user can click on the recipe function 404 to quickly load a predefined recipe. In some embodiments, the user may receive a summary table of all recipe configurations by clicking on the recipe function 404.

In order to trigger a scan, the user can click on the scan function 405, which instructs the controller 210 to receive data from the optical detector 202 in accordance with the configurations in the recipe 404. In some embodiments, in order to change scan parameters such as, for example scan speed, scan direction, exposure time, etc., the user can click on the modify function 406 to view and modify a current recipe, add a new recipe based on a new target surface or a new part, or delete a recipe. In some embodiments, a message can be triggered by the interface 400 to the user suggesting a switch of the optical detector based on the selected recipe and/or configured scan parameters. The user may receive the scan process and raw data from the progress bar 409 and laser profile window 410. The user may also select a recipe from a predefined library from a drawdown selection list 411 and view the scan configuration associated with this recipe in the scan parameter block 412 and 413. The current position of the scan can be also displayed in the current position block 414 with a status report of the motors 415 for controlling the position of the optical detector 202.

Figure 5:
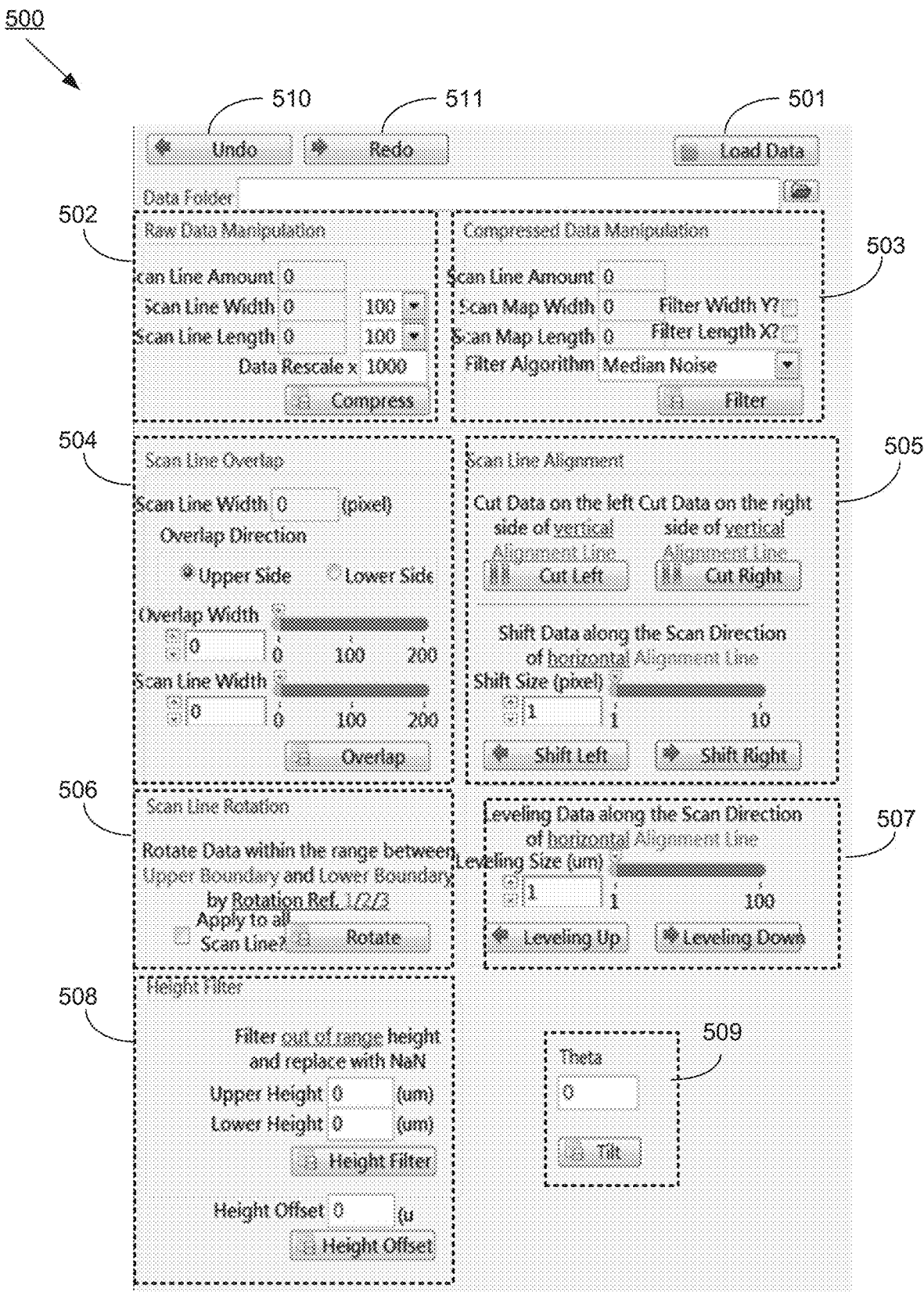
FIG. 5 is a graphic representation of a user interface of a software program that is used for image processing during construction of a complete surface topology image, in accordance with some embodiments.

FIG. 5 is a graphic representation of a user interface 500 of a software program that is used for configuring image processing for the construction of a complete surface topology image, in accordance with some embodiments. A user can load raw topological data from a data storage folder by clicking on the load data virtual button 501. In some embodiments, the data may comprise at least one average distance at one X-Y position. Based on the required resolution and computing performance, raw topological data can be compressed in both X- and Y-direction in the raw topological data manipulation block 502 by selecting parameter values such as scan line amount, scan line width, scan line length and data rescale, as shown in block 502. Compressed data can be initially filtered in the compressed data manipulation block 503 by selecting parameter values such as scan line amount, scan map width scan map length, filter in the X-Y direction and filter algorithm, as shown in block 503. The user can use the scan line overlap block 504 to eliminate scanline overlap by selecting parameter values such as overlap width, scan line width, and overlap direction, when constructing a full image from line scans to eliminate sharp boundary between line scans, as shown in block 504. The user can use the scan line alignment block 505 to align the scan lines by selecting parameter values such as cutting data on the left/right and the size of pixel for shifting the data along the scan direction, as shown in block 505. In one embodiment, as shown in FIG. 6A, using these functions compressed line scan images 602 in FIG. 6A-1 can be overlapped to achieve a corrected surface image 604 as shown in FIG. 6A-2. In order to eliminate the stage leveling error, the users can select three points on the stage. These three points can be used to define a reference plane on to which all the data points are projected. The user can realize this function by clicking on the reference points 1, 2 and 3 in the scan line rotation bock 506 to select the reference points (e.g., 606A, 606B and 606C in FIG. 6B). Similarly, the user can also level the data only along the scan direction based on a horizontal alignment line by selecting the leveling size and level direction (e.g., up or down) in the leveling block 507. In order to eliminate the background, typically from the stage, the user can input values for parameter such as out-of-range height and height-offset values based on the leveled data, in the height filter block. In one embodiment shown in FIG. 6C, a background 610 in a surface scan image 608 as shown in FIG. 6C-1 can be removed in the corrected image showing just the surface scan image 608 as shown in FIG. 6C-2. In order to eliminate the sensor tilt problem associated with a system with a traditional laser displacement sensor, the user can input a tilt angle (e.g., theta) in the tilt block 509 to correct this effect. In one embodiment shown in FIG. 6D, a surface scan image 612 from an assembly of line scan images that are collected using a misaligned laser displacement sensor illustrates horizontal line features (614A-D) as shown in FIG. 6D-1 before correction. These artificial line features caused by the misalignment (i.e., tilt problem) can be corrected and removed by the tilt correction function provided by the software resulting in a smooth uniform surface in the corrected surface image 616 as shown in FIG. 6D-2 after correction. The user can also have a flexibility to undo or redo any of this processing at any point of the process by clicking on the undo 510 and redo 511. In one embodiment, line scan images 618 as shown in FIG. 6E-1 can be assembled automatically using an auto-merge function to form a surface image 620 as shown in FIG. 6E-2.

FIG. 7 shows an exemplary user interface for selecting various post-processing functions, in accordance with some embodiments. Post-processing functions, such as for instance step height 702, bump width 704, distance 706, peak-to-peak 708, curvature 710, etc, can be applied on the corrected surface images to determine geometric parameters on the target surface, as shown in FIG. 7.

Figure 8:
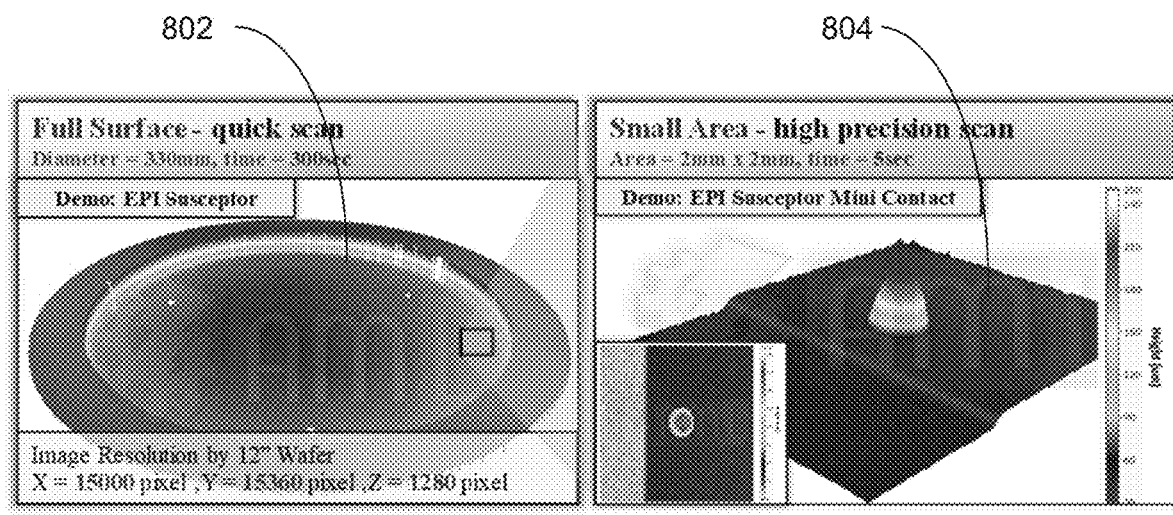
FIG. 8 illustrates a scan image of a full surface of a susceptor obtained by performing a full scan, and a scan image of a small area on the susceptor surface obtained by performing a quick scan, in accordance with some embodiments.

In some embodiments, the laser scanning system is configured to provide a full scan of large areas in a first mode as well as a high-precision scan on small areas in a second mode. FIG. 8 illustrates a scan image 802 of a full surface of a susceptor obtained by performing a full scan, and a scan image 804 of a small area on the susceptor surface obtained by performing a quick scan, in accordance with some embodiments. In one embodiment, a scan on the surface of an entire susceptor with a diameter of 330 millimeter can be accomplished in 300 seconds with a spatial resolution of ~20 micrometer in the X-Y direction. In another embodiment, a scan of a small area (2×2 mm$^2$) on the surface of the susceptor can be accomplished in 5 seconds with a spatial resolution of 1 micrometers in the X-Y direction. In some embodiments, the spatial resolution can be tubed by the number of sampling points on the target surface.

Figure 9:
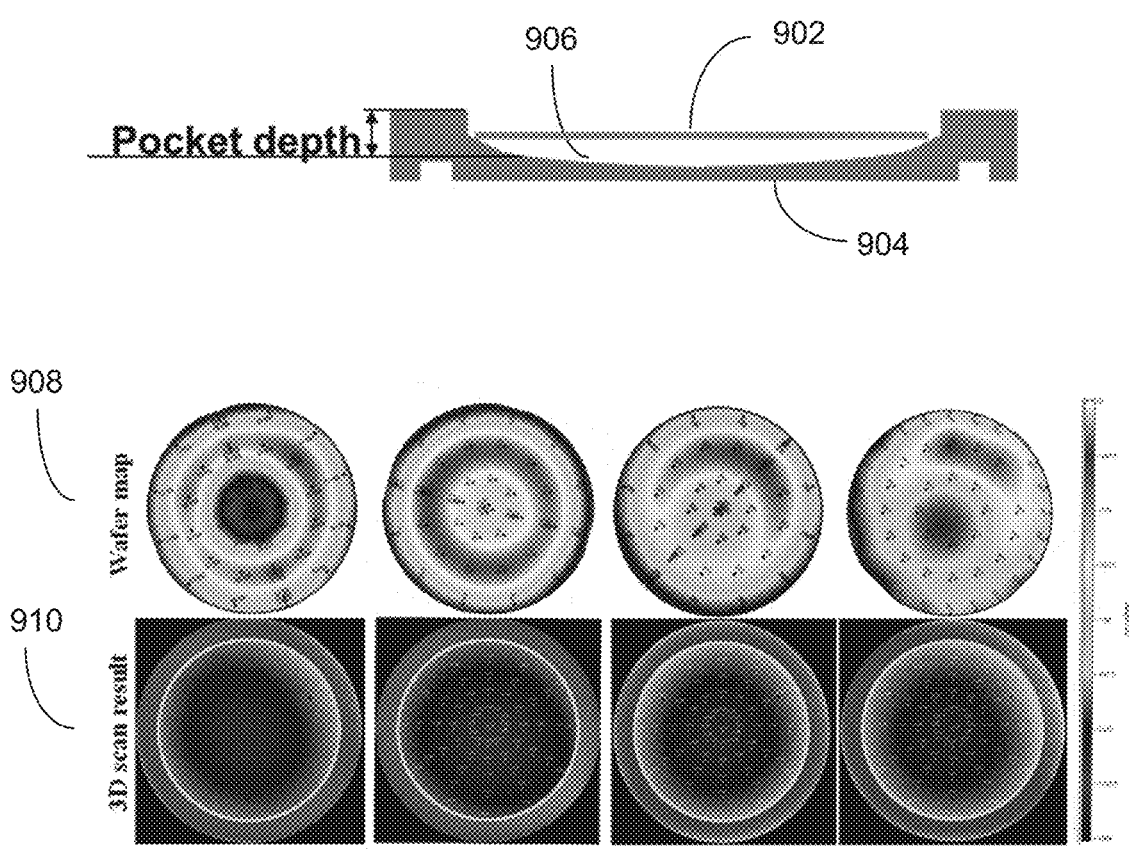
FIG. 9 illustrates a cross-sectional schematic of a wafer supported on a susceptor and a surface profile of the susceptor, in accordance with one embodiment.

FIG. 9 illustrates a cross-sectional schematic of a wafer 902 supported on a susceptor 904 and a corrected image 908 of the susceptor curved surface 906, in accordance with one embodiment. The wafer 902 is placed on a susceptor 904 containing a continuously curved surface 906 from one end to the other. This curved surface 906 on the susceptor 904 causes a continuously varying pocket depth and a continuously varying gap between the bottom surface of the wafer 902 and the curved surface 906 of the susceptor 904, which can affect the film deposition on the top surface of the wafer 902, as indicated by the shading in the image 908.

Figure 10:
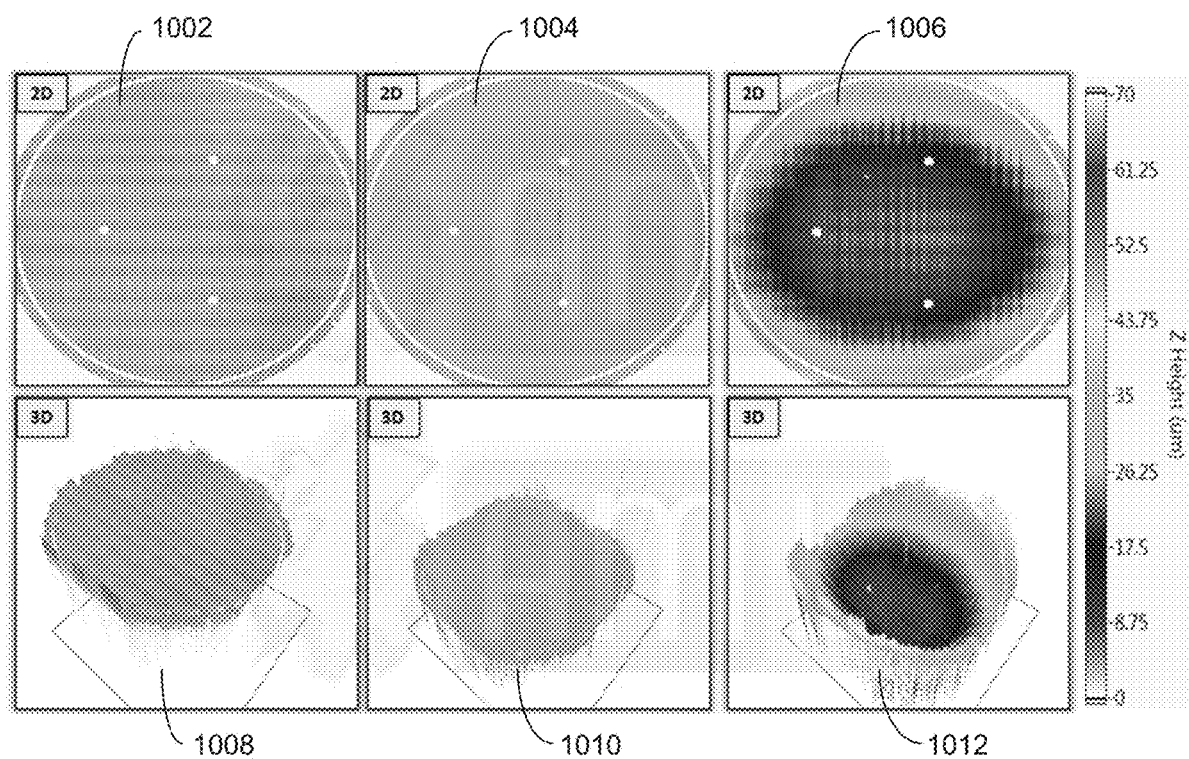
FIG. 10 shows another application of this method to determine the surface flatness of a bond-chunk, in accordance with one embodiment.

FIG. 10 shows another application of this method to determine the surface flatness of a bond-chunk, in accordance with one embodiment. Three bond-chunks are measured using this presented method, including a new (2D— 1002 and 3D— 1008), a vendor refurbished (2D— 1004 and 3D 1010) and a used (2D— 1006 and 3D— 1012) one. The surface images determined using this method on these three exemplary chunks clearly show that the new one has a thickness that is thicker than that of the refurbished one, which can be caused by a polishing process during the refurbishment, in accordance with some embodiments. The flatness determined using this method on corrected surface images is 3 micrometers for the new chunk and 13 micrometers for the vendor refurbished chunk. The surface images of the used chunk that could be potentially problematic show a downward bending surface with a thinnest area at the center of the chunk. The surface flatness determined using the presented method on the corrected image is 37 micrometers.

In some embodiment, a method for scanning and analyzing a surface, the method comprising: receiving a piece of equipment with a target surface for inspection; receiving an input from a user; determining at least one scan parameter based on the user input; scanning the target surface using an optical detector in accordance with the at least one scan parameter; generating an image of the target surface; correcting the image of the target surface to remove at least one undesired feature to generate a corrected image based on the at least one scan parameter; and analyzing the corrected image to determine at least one geometric parameter of the target surface.

In another embodiment, an inspection system for scanning and analyzing a surface comprising: an optical detector configured to scan a target surface of a piece of equipment and generate a plurality of line scan images of the target surface; a positioning system configured to transfer the optical detector from a first to a second position; a user interface configured to receive user inputs for determining parameters for scanning the target surface and for correcting a scanned image of the target surface to remove at least one undesired feature; and at least one processor configured to correct the scanned image in accordance with at least one parameter for correcting the scanned image, and analyze the corrected image to determine at least one geometric parameter of the target surface.

Yet, in another embodiment, a non-transitory computer readable medium storing computer-executable instructions that when executed by a computer perform a method for scanning and analyzing a surface, the method comprising: receiving a piece of equipment with a target surface for inspection; receiving an input from a user; determining at least one scan parameter based on the user input; scanning the target surface using an optical detector in accordance with the at least one scan parameter; generating an image of the target surface; correcting the image of the target surface to remove at least one undesired feature to generate a corrected image based on the at least one scan parameter; and analyzing the corrected image to determine at least one geometric parameter of the target surface.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method for scanning and analyzing a surface, the method comprising:
   receiving a piece of equipment with a target surface for inspection;
   receiving an input from a user, wherein the input comprises at least one of: a scan line width, a scan line length, a scan line overlap width, a scan line alignment value, a height filter value and a tilt correction value;
   determining at least one scan parameter based on the user input;
   scanning the target surface using an optical detector in accordance with the at least one scan parameter;
   generating an image of the target surface;
   correcting the image of the target surface to remove at least one undesired feature to generate a corrected image based on the input from the user; and
   analyzing the corrected image to determine at least one geometric parameter of the target surface.

2. The method of claim 1, wherein the at least one scan parameter comprises at least one of a first or second scanning mode, wherein the first scanning mode scans a first area of the target surface and the second scanning mode scans a second area of the target surface that is smaller than the first area.

3. The method of claim 1, wherein the at least one scan parameter comprises at least one of a scan range, a scan speed, and an exposure time.

4. The method of claim 1, wherein the generating an image of the target surface comprises:
   providing pixel data from the optical detector to a local processor;
   processing the pixel data to form a line scan image; and
   assembling a plurality of line scan images to generate the image of the target surface.

5. The method of claim 1, wherein the correcting the image of the target surface comprises overlapping adjacent line scan images of the target surface.

6. The method of claim 1, wherein the correcting the image of the target surface further comprises at least one of the following:

a leveling correction of the image of the target surface according to a reference plane;

a tilt correction of the image of the target surface to remove effect caused by misalignment between the optical detector and the target surface; and a filter correction of the image of the target surface to remove a background of the target surface image.

7. The method of claim 6, wherein the reference plane is defined by selecting a plurality of points on the image of the target surface through a user interface.

8. The method of claim 1, wherein the at least one geometric parameter includes at least one of: a step height, a bump width, a distance between two points on the target surface, a peak-to-peak height, and curvature of the target surface.

9. An inspection system for scanning and analyzing a surface comprising:

an optical detector configured to scan a target surface of a piece of equipment and generate a plurality of line scan images of the target surface;

a positioning system configured to transfer the optical detector from a first to a second position;

a user interface configured to receive a user input for determining a parameter for scanning the target surface and for correcting a scanned image of the target surface to remove at least one undesired feature, wherein the user input comprises at least one of: a scan line width, a scan line length, a scan line overlap width, a scan line alignment value, a height filter value and a tilt correction value; and at least one processor configured to correct the scanned image in accordance with the user input, and analyze the corrected image to determine at least one geometric parameter of the target surface.

10. The system of claim 9, wherein the optical detector comprises a light source, a photodetector and a plurality of optical lenses.

11. The system of claim 9, wherein the parameters comprise at least one of: a scan range, a scan speed, and an exposure time.

12. The system of claim 9, wherein correcting the scanned image of the target surface comprises overlapping adjacent line scan images of the target surface.

13. The system of claim 9, wherein the parameters comprise at least one of:

a reference plane by selecting a plurality of points on the scanned image;

a tilt angle between the optical detector and the target surface to remove an effect caused by a tilt misalignment between the optical detector and the target surface; and a height-filter range configured to remove a background of the target surface image.

14. The system of claim 9, wherein the at least one processor coupled to the optical detector is further configured to:

receive pixel data from the optical detector, wherein the pixel data contain position coordination information in a vertical direction and in a horizontal plane;

preprocess the pixel data to form a line scan image; and assemble a plurality of line scan images to generate the scanned image of the target surface.

15. A non-transitory computer readable medium storing computer-executable instructions that when executed by a computer perform a method for scanning and analyzing a surface, the method comprising:

receiving a piece of equipment with a target surface for inspection;

receiving an input from a user, wherein the input comprises at least one of: a scan line width, a scan line length, a scan line overlap width, a scan line alignment value, a height filter value and a tilt correction value;

determining at least one scan parameter based on the user input;

scanning the target surface using an optical detector in accordance with the at least one scan parameter;

generating an image of the target surface;

correcting the image of the target surface to remove at least one undesired feature to generate a corrected image based on the input from the user; and analyzing the corrected image to determine at least one geometric parameter of the target surface.

16. The non-transitory computer readable medium of claim 15, wherein the at least one scan parameter comprises at least one of a first or second scanning mode, wherein the first scanning mode scans a first area of the target surface and the second scanning mode scans a second area of the target surface that is smaller than the first area.

17. The non-transitory computer readable medium of claim 15, wherein the at least one scan parameter comprises at least one of a scan range, a scan speed, and an exposure time.

18. The non-transitory computer readable medium of claim 15, wherein the generating an image of the target surface comprises:

providing pixel data from the optical detector to a local processor;

processing the pixel data to form a line scan image; and assembling a plurality of line scan images to generate the image of the target surface.

19. The non-transitory computer readable medium of claim 15, wherein the correcting the image of the target surface comprises overlapping adjacent line scan images of the target surface.

20. The non-transitory computer readable medium of claim 15, wherein the correcting the image of the target surface further comprises at least one of the following:

a leveling correction of the image of the target surface according to a reference plane;

a tilt correction of the image of the target surface to remove effect caused by misalignment between the optical detector and the target surface; and a filter correction of the image of the target surface to remove a background of the target surface image.

\* \* \* \* \*